UNITED STATES PATENT OFFICE.

J. J. ECKEL AND ISAAC S. SCHUYLER, OF NEW YORK, N. Y., ASSIGNEES OF JOSEPH SHORT.

IMPROVED PROCESS FOR BLEACHING FIBROUS SUBSTANCES.

Specification forming part of Letters Patent No. 52,250, dated January 23, 1866; Reissue No. 2,217, dated April 3, 1866.

*To all whom it may concern:*

Be it known that JOSEPH SHORT, of the city, county, and State of New York, did invent a new and Improved Process for Bleaching Fibrous Substances, for which Letters Patent, bearing date January 23, 1866, were, by assignments duly recorded in the Patent Office, issued to him, J. J. ECKEL, and ISAAC S. SCHUYLER, who, for the purpose of obtaining a reissue, do hereby declare the following to be a full, clear, and exact description of said invention.

The invention we term a "new and improved process for bleaching fibrous substances and fabrics manufactured from said substances," and is more especially designed for bleaching straw and flax and hemp fiber for paper-stock, and also for bleaching damaged cotton, wool, and cotton fabrics. The fiber is first subjected to a washing, to deprive it of all dirt, grease, &c., as follows: To one barrel of water (about thirty-six (36) gallons) there are added potash or caustic soda, ten pounds; chloride of sodium, (salt,) three pounds, or an equivalent amount of ox-gall, spirits of ammonia, or spirits of wine. The stock or fiber is then put in the liquid and boiled steadily about thirty (30) minutes, and is then taken out of the liquid and the latter expressed from it by means of rollers or otherwise, and the liquid preserved, as it may be repeatedly used. The stock or fiber is then washed in clean or pure water. The bleaching is effected as follows: To one barrel of water, thirty-six (36) gallons, add chloride of lime, fifteen pounds; sulphuric acid, eighteen ounces. The acid is to be added gradually. This bleaching-liquid is to be well stirred, and the cleaned stock or fiber is placed into it in proper quantities at a time and kept submerged.

Instead of sulphuric acid, muriatic acid may be used; but the latter I consider inferior. Other acids might also be used, and for the alkali wash liquid potassa may be used; instead of the caustic soda and chloride of lime, spirits of ammonia, or spirits of wine, all or any of the last-named substances being used, the office of which is to reduce or separate the fiber. The liquid potassa enables the solution to be used cold—that is to say, no boiling will be required—and that in many cases is a great advantage, economizing in time, and avoiding the expense of furnaces, boilers, &c.

The cold solution may be formed thus: water, one gallon; liquid potassa, four ounces; spirits of ammonia, four ounces; or an equivalent amount of chloride of sodium or spirits of wine.

Having thus described the invention, we claim as new and desire to secure by Letters Patent—

1. The washing or cleansing liquid composed of potash or caustic soda, and the chloride of sodium, spirits of ammonia, or an equivalent substance dissolved in water, about in the proportion as set forth.

2. The cold alkaline solution composed of liquid potassa and the chloride of sodium, spirits of ammonia, or an equivalent substance and water, about in the proportion as set forth.

3. The bleaching-liquid compound of chloride of lime and sulphuric or other acid, about in the proportion as set forth.

The above specification of our reissue signed by us this 20th day of February, 1866.

J. J. ECKEL.
I. S. SCHUYLER.

Witnesses:
WM. F. MCNAMARA,
A. R. HAIGHT.